US012465916B1

(12) United States Patent
Alanis et al.

(10) Patent No.: US 12,465,916 B1
(45) Date of Patent: Nov. 11, 2025

(54) BIOLOGICAL SAMPLE PROCESSING ASSEMBLIES AND METHODS

(71) Applicant: Amazon Technologies, Inc., Seattle, WA (US)

(72) Inventors: Manuela Alanis, Buenos Aires (AR); Bruno Nicolas Bavaresco Elissetche, Buenos Aires (AR); William Brian Greger, San Francisco, CA (US)

(73) Assignee: Amazon Technologies, Inc., Seattle, WA (US)

(*) Notice: Subject to any disclaimer, the term of this patent is extended or adjusted under 35 U.S.C. 154(b) by 1078 days.

(21) Appl. No.: 17/490,799

(22) Filed: Sep. 30, 2021

(51) Int. Cl.
*B01L 3/00* (2006.01)

(52) U.S. Cl.
CPC ..... *B01L 3/5029* (2013.01); *B01L 2200/0684* (2013.01)

(58) Field of Classification Search
CPC ....................... B01L 3/5029; B01L 2200/0684
See application file for complete search history.

(56) References Cited

U.S. PATENT DOCUMENTS 5,084,245 A 1/1992 Berke et al.
5,415,994 A 5/1995 Imrich et al.
2005/0180882 A1 8/2005 Tung et al.
2015/0072362 A1* 3/2015 Lui .......................... G01N 1/10 600/572
2017/0045508 A1* 2/2017 Khattak ............. G01N 27/3273

OTHER PUBLICATIONS

U.S. Appl. No. 17/490,804, U.S. Patent Application, filed Sep. 30, 2021, Titled: Biological Sample Processing Assemblies and Methods.

* cited by examiner

*Primary Examiner* — Samuel P Siefke
(74) *Attorney, Agent, or Firm* — Kilpatrick Townsend & Stockton LLP

(57) ABSTRACT

Biological sample processing system assemblies include a swab chamber assembly configured to enhance transfer of a biological sample on a swab head to a resulting biological sample solution for subsequent processing. A swab chamber assembly includes a fluid channel and an elongated swab chamber having a proximal portion and a distal portion. The swab chamber is configured to accommodate insertion of a swab head of a swab into the swab chamber. The distal portion of the swab chamber slopes downwardly from a distal end of the proximal portion of the swab chamber so that lysis buffer solution transferred into the swab chamber accumulates within the distal portion of the swab chamber.

18 Claims, 17 Drawing Sheets

BIOLOGICAL SAMPLE PROCESSING ASSEMBLIES AND METHODS

BACKGROUND

Biological samples are taken and processed for a wide range of diagnostic purposes. For example, a biological sample can be processed to diagnose whether a person has a pathogen. Timely and accurate detection of a pathogen (e.g., pathogen, bacteria, fungus, parasite, or other microorganism that can cause disease) is important to effective treatment of a person infected with the pathogen. Timely and accurate detection of the pathogen can also help to inhibit spreading of the pathogen from the infected person via suitable precautions taken based on knowing that the person is infected with the pathogen. Timely and accurate detection of a pathogen is especially important where the pathogen has a high lethality in at least some vulnerable populations (e.g., elderly, diabetic, immune compromised), such as with the SARS-CoV-2 virus.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Biological sample processing assemblies and methods described herein are designed for forming a biological sample solution from a biological sample disposed on a swab head of a sample swab. The biological sample solution can then be processed. For example, the biological sample solution can be processed to detect whether a target pathogen(s) is present in the biological sample. In many embodiments, the biological sample processing assemblies and methods described herein are designed to increase the amount of a biological sample disposed on a swab head that is incorporated into the biological sample solution. In many embodiments, the biological sample processing assemblies and methods described herein are designed to decrease the volume of a lysis sample solution that is used to form the biological sample solution.

In many embodiments, the biological sample processing assemblies and methods described herein employ a swab chamber assembly designed to reduce the amount of the biological sample on the swab head that is not incorporated into the resulting biological sample solution due to being deposited on a swab chamber wall during insertion of the swab into the swab chamber. For example, in some embodiments, a translating swab head sleeve is used to maintain separation between the swab head and the swab chamber wall during insertion of the swab into the swab chamber, thereby reducing the amount of the biological sample that is deposited on the swab chamber wall. In some embodiments, the swab chamber is sloped and lysis buffer solution is introduced upslope from a fully inserted swab head, thereby flowing the lysis buffer solution over some of the deposited biological sample to recapture some of the deposited biological sample. In some embodiments, the swab chamber is sloped to reduce the amount of lysis buffer solution required to submerge the inserted swab head.

Figure 1:
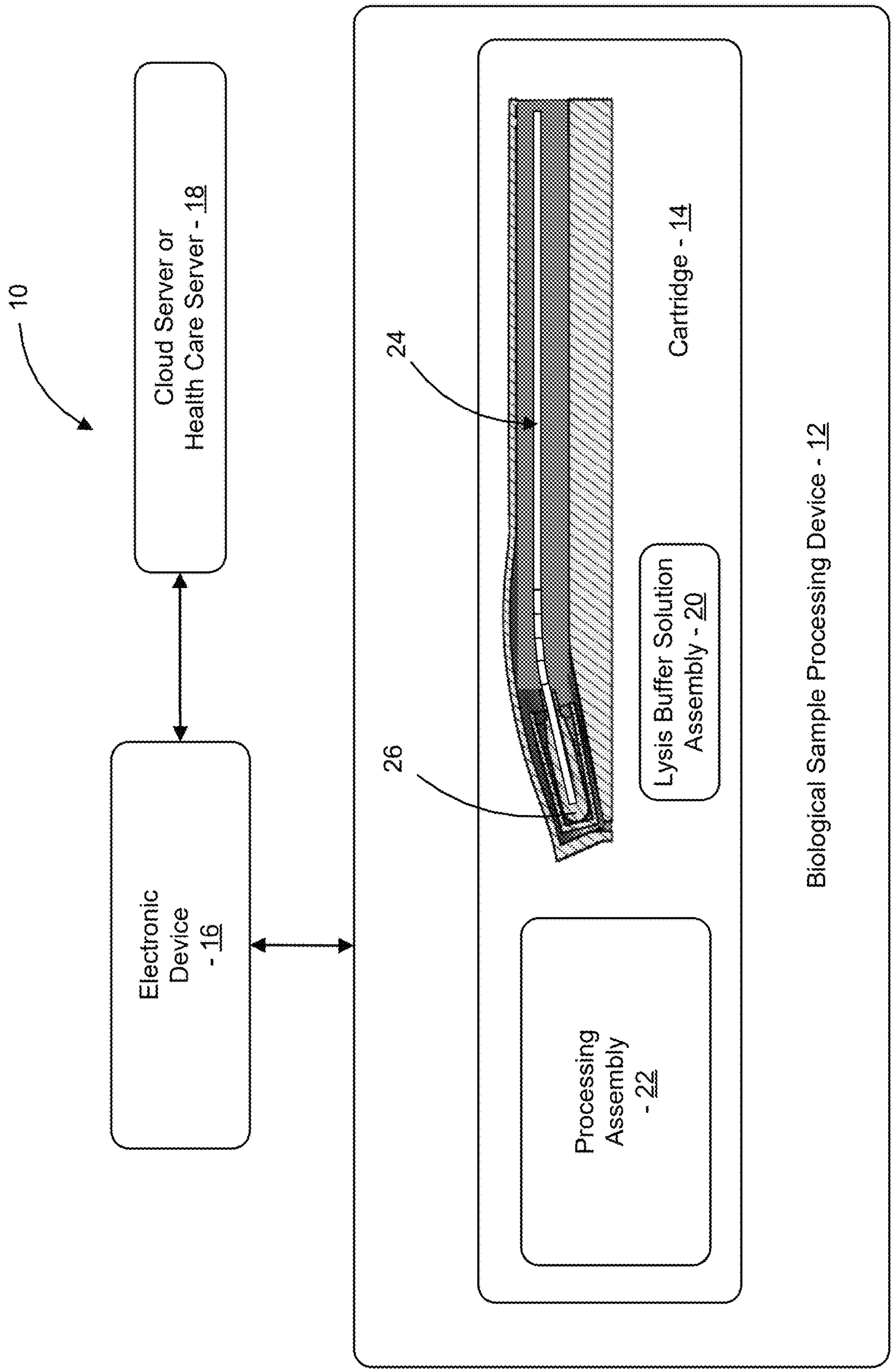
FIG. 1 illustrates a biological sample processing system in accordance with embodiments.

Turning now to the drawing figures in which similar reference identifiers designate similar elements, FIG. 1 illustrates a biological sample processing system 10 in accordance with embodiments. The biological sample processing system 10 includes biological sample processing device 12 and a single use cartridge 14. The biological sample processing system 10 can optionally further include an electronic device 16 and/or a cloud server or health care server 18. The single use cartridge 14 includes a lysis buffer solution assembly 20 and a processing assembly 22. In many embodiments, a biological sample is taken with a swab 24 having a swab head 26. The swab 24 is inserted into the cartridge 14. The cartridge 14 is inserted into the biological sample processing device 12. The biological sample processing device 12 interacts with the cartridge 14 to operate the lysis buffer solution assembly 20 to form a biological sample solution from the biological sample disposed on the swab head 26 and a lysis buffer solution. Any suitable approach for forming the biological sample solution can be employed. For example, the lysis buffer solution assembly 20 can be configured to hydrate a lysis buffer lyophilized bead and then transfer the resulting lysis buffer solution onto the swab head 26 to incorporate the biological sample. The resulting biological sample solution is extracted and transferred to the processing assembly 22 for processing to, for example, detect whether a target pathogen is present in the biological sample. The biological sample processing device 12 communicates with the electronic device 16 to either transmit a detection result to the electronic device 16 or transmit test data to the electronic device 16 by which the electronic device 16 can determine the detection result. The electronic device 16 can communicate with a cloud server or health care server 18 to either transmit a detection result to the healthcare server 18 or transmit test data to the healthcare server 18 by which the healthcare server 18 can determine the detection result. The system 10 can be adapted for use in processing any suitable biological sample(s).

Figure 2:
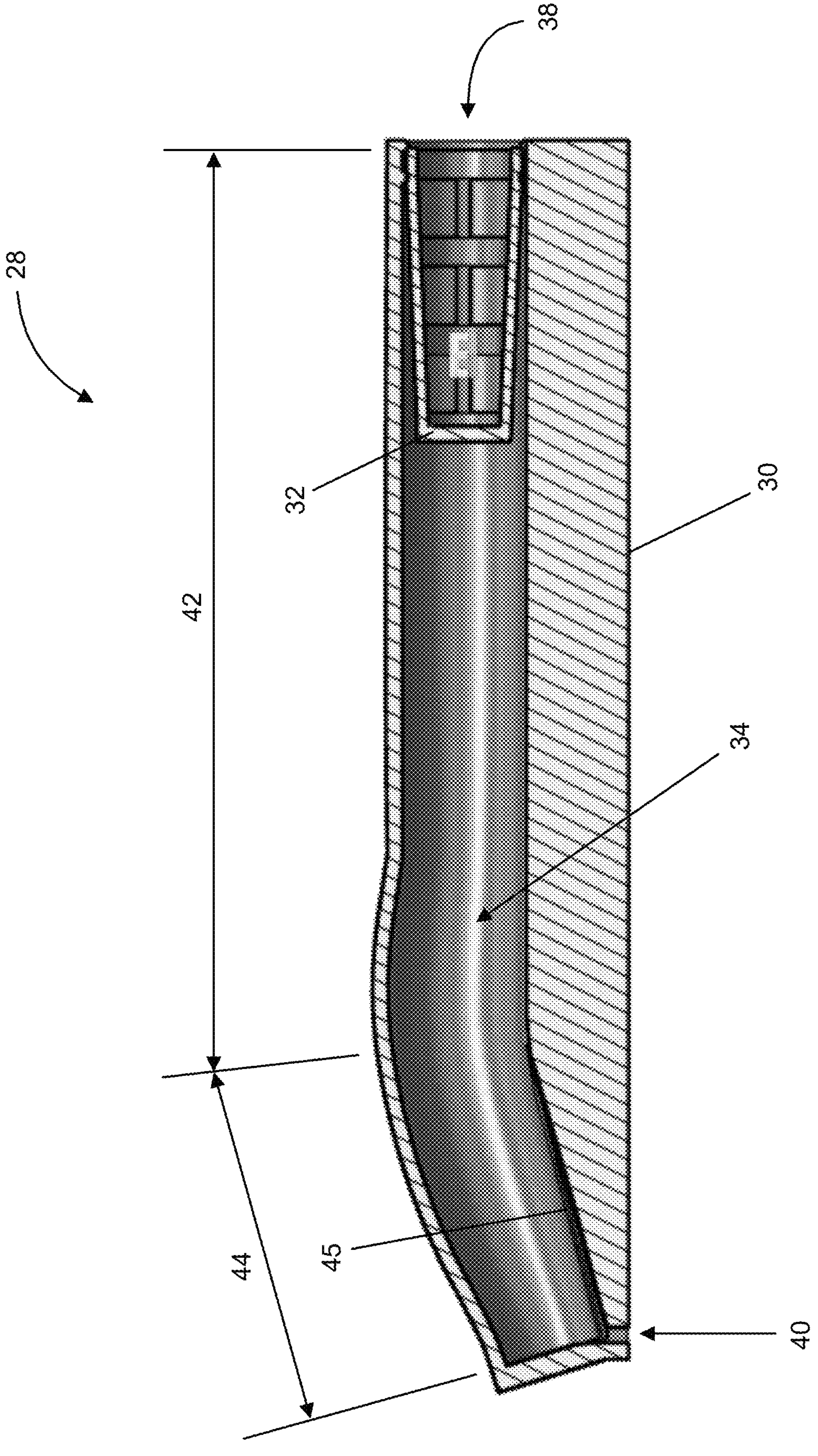
FIG. 2 illustrates a swab chamber assembly of the biological sample processing system of FIG. 1.
Figure 3:
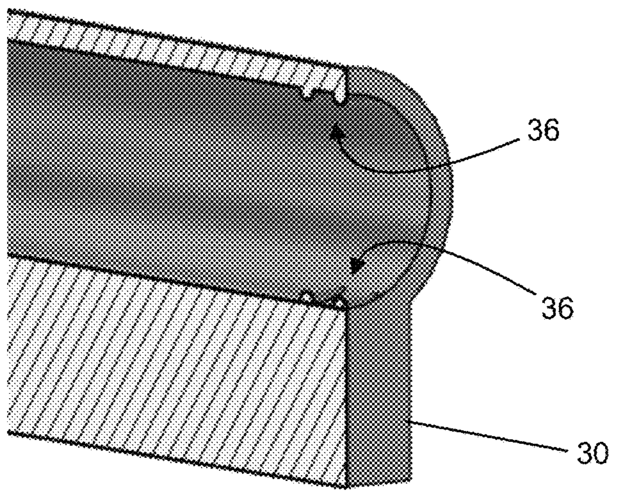
FIG. 3 illustrates detent features of a swab chamber housing of the swab chamber assembly of FIG. 2.

FIG. 2 illustrates a swab chamber assembly 28 of the biological sample processing system 10. The swab chamber assembly 28 includes a swab chamber housing 30 and a swab head sleeve 32. The swab chamber housing 30 defines an elongated swab chamber 34. As also shown in FIG. 3, the swab chamber housing 30 includes detent features 36 configured to retain the swab head sleeve 32 in the illustrated position and orientation for receipt of the swab head 26 into a central cavity 38 of the swab head sleeve 32. The swab chamber housing 30 also includes a fluid channel 40. The elongated swab chamber 34 includes a proximal portion 42 and a distal portion 44. The proximal portion 42 can be horizontal or sloped in a use orientation of the cartridge 14 as held by the biological sample processing device 12. The distal portion 44 slopes downwardly from a distal end of the proximal portion 42 at a greater slope in the distal direction than for the proximal portion 42. The slope of the distal portion 44 can be greater than the slope of the proximal portion 42 by any suitable amount. For example, in many embodiments, the average slope of the distal portion 44 is greater than the average slope of the proximal portion 42 by at least 5 degrees. In some embodiments, the average slope of the distal portion 44 is greater than the average slope of the proximal portion 42 by an angle in a range from 10 degrees to 30 degrees. Disposed on the bottom surface of the distal portion 44 are elongated ridges or recesses 45 configured to accommodate flow of fluid underneath the swab head sleeve 32 for evacuation of the resulting biological sample fluid from the swab chamber 34 via the fluid channel 40.

Figure 4:
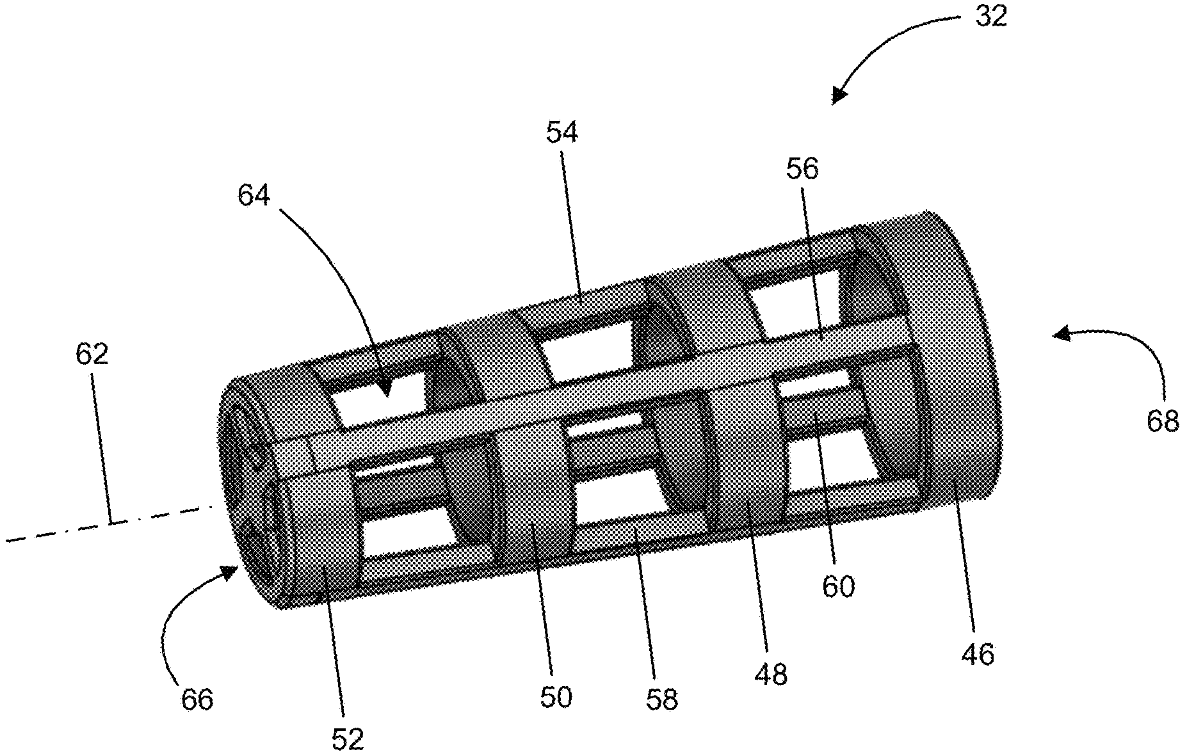
FIG. 4 illustrates a swab head sleeve of the swab chamber assembly of FIG. 2.

FIG. 4 illustrates the swab head sleeve 32 of the swab chamber assembly 28. In the illustrated embodiment, the swab head sleeve 32 includes annular rings 46, 48, 50, 52 and longitudinal struts 54, 56, 58, 60. The annular rings 46, 48, 50, 58 are spaced apart by the longitudinal struts 54, 56, 58, 60 along a longitudinal axis 62 of the swab head sleeve 32. The swab head sleeve 32 includes annular apertures 64. Each of the annular apertures 64 is defined by a corresponding pair of the annular rings 46, 48, 50, 52 in combination with a corresponding pair of the longitudinal struts 54, 56, 58, 60. The swab head sleeve 32 has a tapered profile so as to reduce in diameter in a distal direction of the swab head sleeve 32. The swab head sleeve 32 includes distal tip apertures 66 in a distal end portion of the swab head sleeve 32. The swab head sleeve 32 includes a swab head entrance 68 at a proximal end of the swab head sleeve 32 via which the swab head 26 of a sample swab 24 is inserted into the swab head sleeve 32.

The swab head sleeve 32 can have any suitable alternative configuration. In many embodiments, the swab head sleeve 32 is configured to: 1) accommodate bending the sample swab 24 to accommodate the increase in slope of the distal portion 44 of the elongated swab chamber 34 relative to the proximal portion 42 of the elongated swab chamber 34 during insertion of the swab 24 into the swab chamber 34, 2) accommodate hydration of the swab head 26, and 3) accommodate transfer of the resulting biological sample solution from the elongated swab chamber 34 for further processing.

Figure 5:
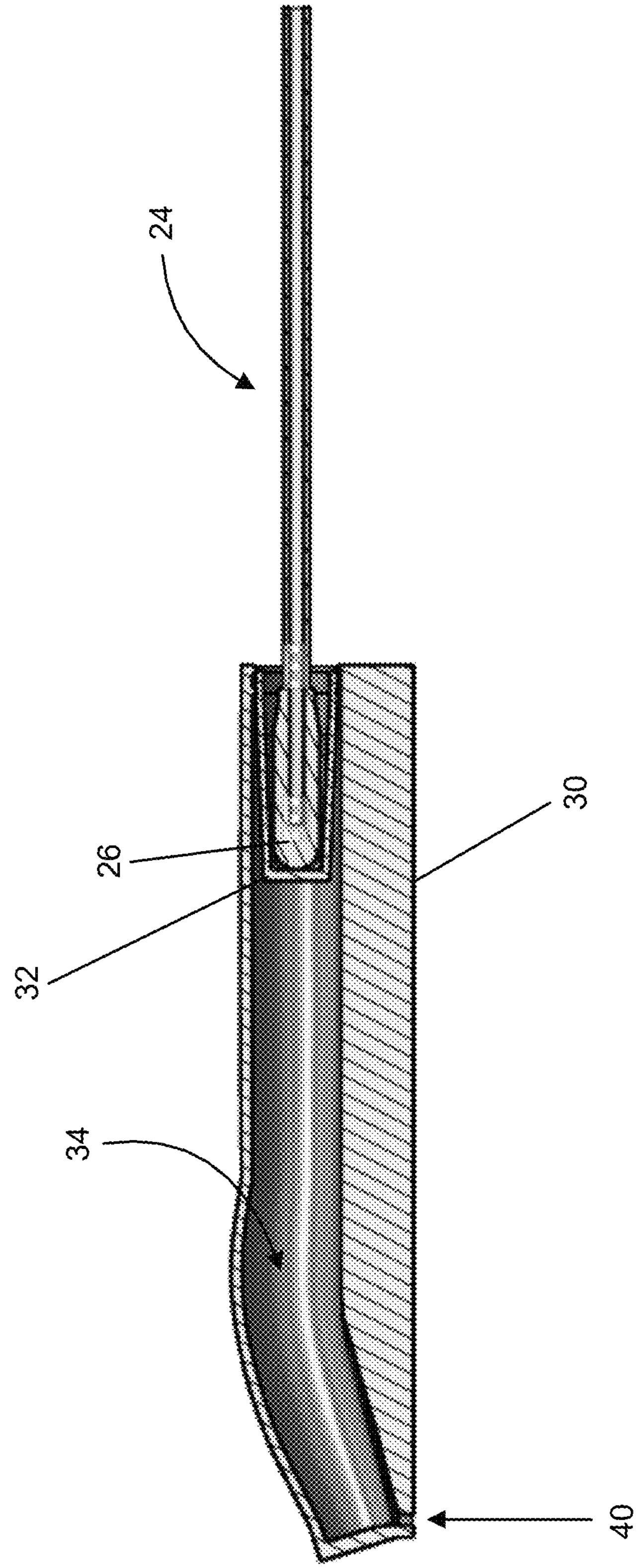
FIG. 5 illustrates insertion of a swab head into the swab head sleeve of the swab chamber assembly of FIG. 2.
Figure 6:
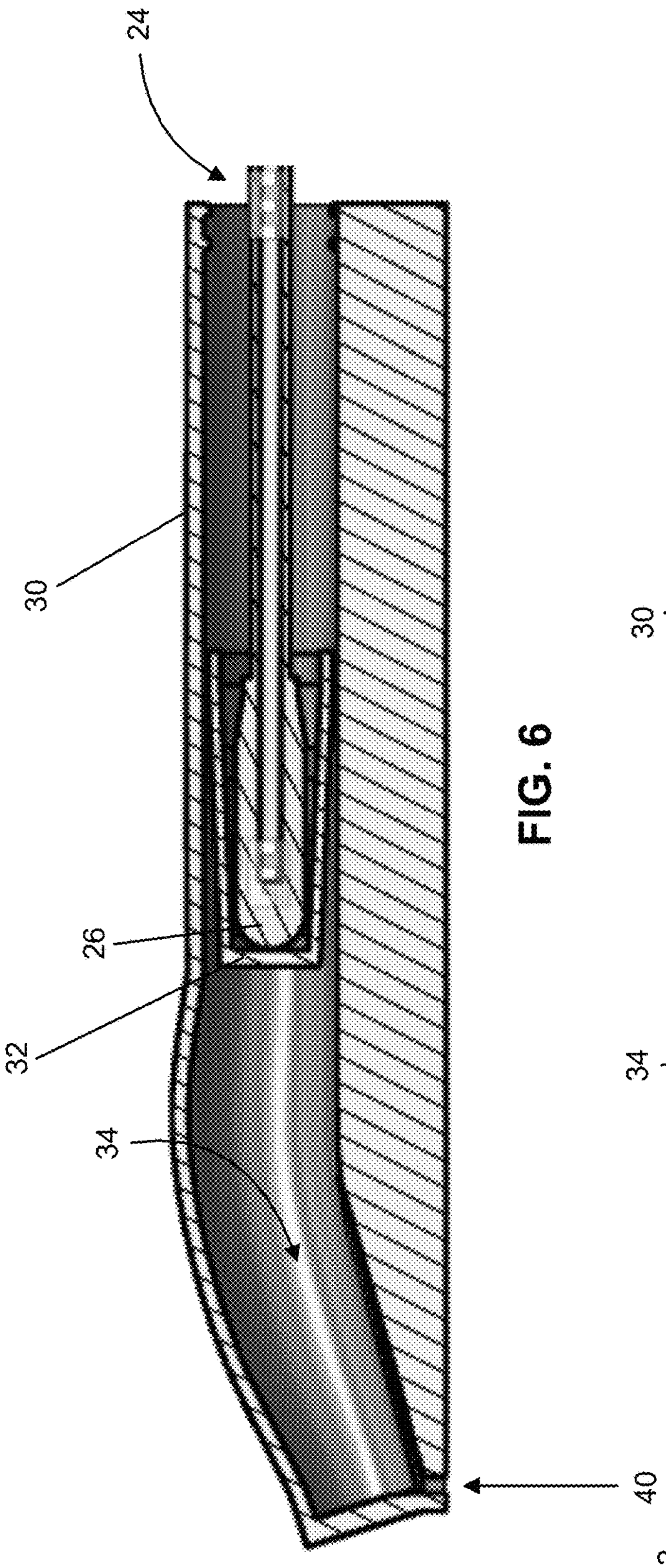
FIG. 6 illustrates a stage of advancement of the swab head and swab head sleeve towards the distal end of the swab chamber of the swab chamber assembly of FIG. 2.
Figure 7:
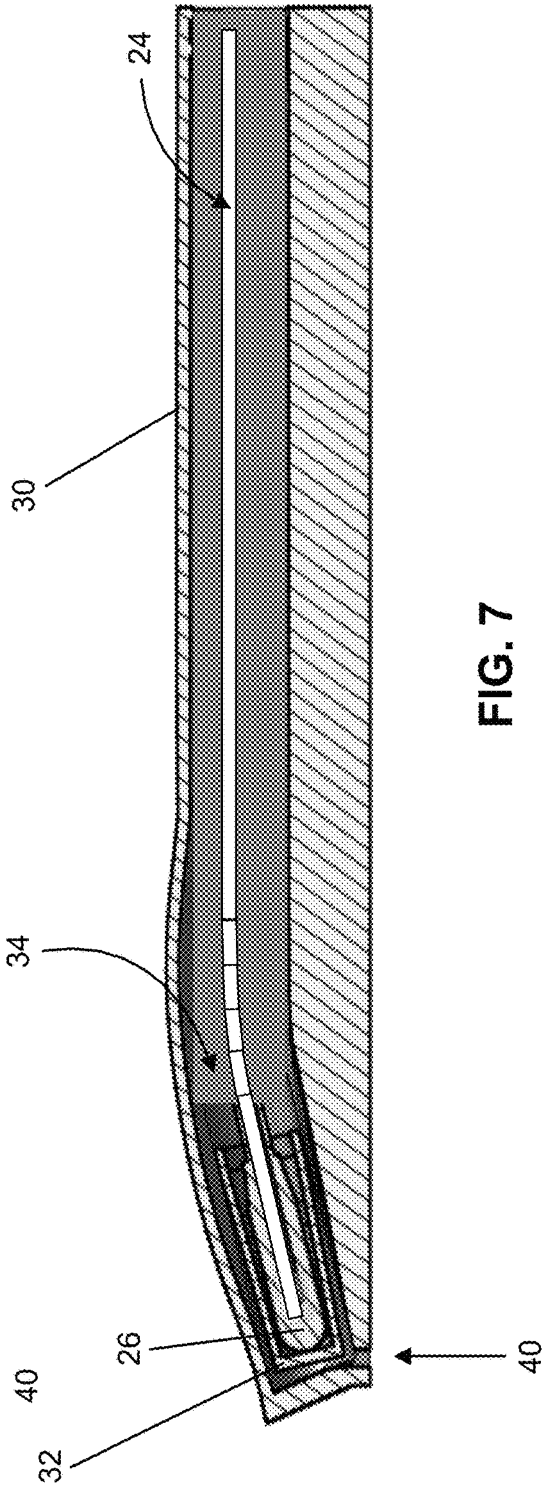
FIG. 7 illustrates the swab head and swab head sleeve fully inserted into the swab chamber of the swab chamber assembly of FIG. 2.

FIG. 5, FIG. 6, and FIG. 7 illustrate insertion of a sample swab 24 into the swab chamber 34. FIG. 5 illustrates insertion of the swab head 26 into the swab head sleeve 32. Following insertion of the swab head 26 into the swab head sleeve 32, the swab head 26 and the swab head sleeve 32 are advanced towards the distal end of the swab camber 34 via continued distal advancement of the sample swab 24 into the swab chamber 34. FIG. 6 illustrates a stage of advancement of the swab head 26 and swab head sleeve 32 towards the distal end of the swab chamber 34. FIG. 7 illustrates the swab head 26 and swab head sleeve 32 fully inserted into the swab chamber 34. During the insertion of the swab 26 into the swab chamber 34, the swab head sleeve 32 maintains separation between the wall of the swab chamber 34 and the swab head 26, thereby inhibiting deposition of biological sample from the swab head 26 onto the wall of the swab chamber 34. Due to the lower elevation of the distal portion 44 of the swab chamber 34 relative to the proximal portion 42 of the swab chamber 34, the volume of lysis buffer required to sufficiently submerge the swab head 26 in the fully inserted configuration is reduced relative to a straight horizontal swab chamber. The greater downward slope of the distal portion 44 of the swab chamber 34 relative to the proximal portion 42 of the swab chamber 34 also reduces the overall height of the swab chamber 34.

Figure 8:
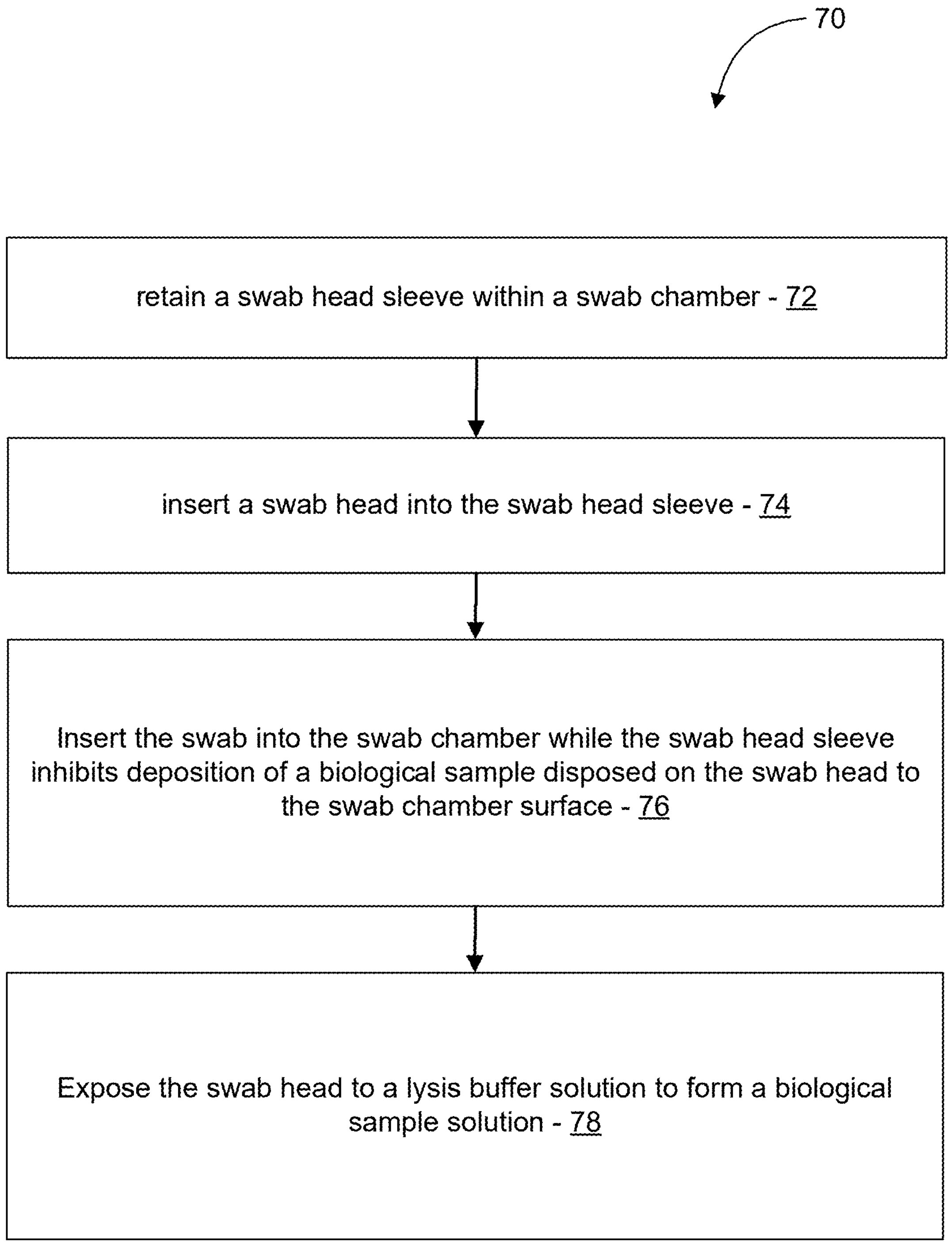
FIG. 8 is a simplified block diagram of acts of a method for forming a biological sample solution from a biological sample that can be practiced using the swab chamber assembly of FIG. 2.

FIG. 8 is a simplified block diagram of acts of a method 70 for forming a biological sample solution from a biological sample that can be practiced using the swab chamber assembly 28. In act 72, the swab head sleeve 32 is retained within the proximal portion 42 of the elongated swab chamber 34. In act 74, the swab head 26 of the sample swab 24 is received into the swab head sleeve 32. In act 76, the swab head sleeve 32 guides the swab head 26 along the elongated swab chamber 34 from the proximal portion 42 of the swab chamber 34 to the distal portion 44 of the swab chamber 34 so as to keep the swab head 26 spaced from the swab chamber surface to inhibit transfer of a biological sample disposed on the swab head 26 to the swab chamber surface. In act 78, with the swab head 26 disposed in the receptacle of the swab head sleeve 32 disposed at a distal end of the elongated swab chamber 34, the swab head 26 is exposed to a lysis buffer solution to transfer the biological sample from the swab head 26 to the lysis buffer solution to form a resulting biological sample solution.

Some or all of the method 70 (or any other methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 9:
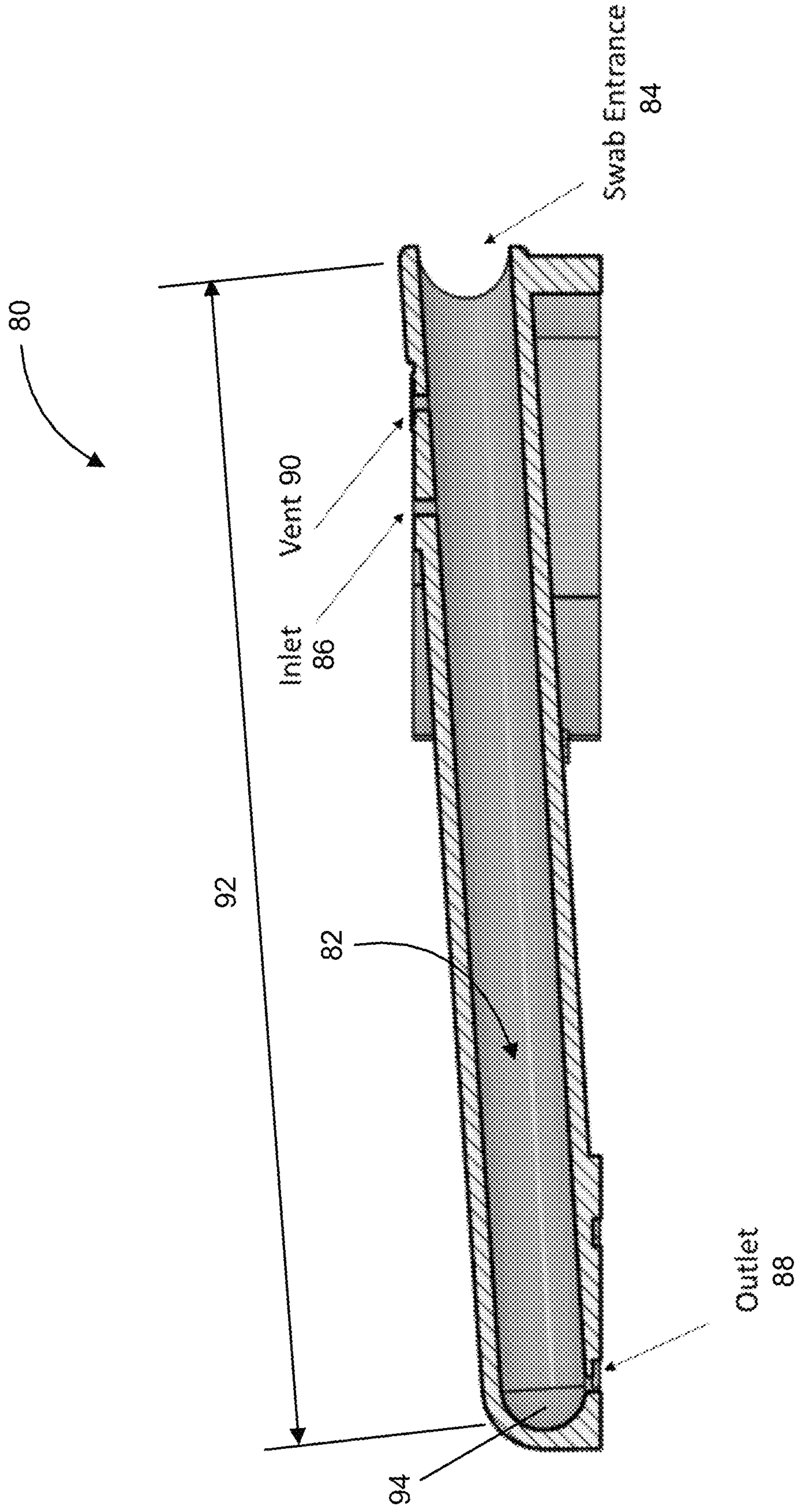
FIG. 9 illustrates a swab chamber housing that can be used in an alternate embodiment of the biological sample processing system of FIG. 1.

FIG. 9 illustrates a swab chamber housing 80 that can be used in an alternate embodiment of the cartridge 14 of the biological sample processing system 10 instead of the swab chamber assembly 20. The swab chamber housing 80 includes an elongated sloped swab chamber 82, a swab entrance 84, a lysis buffer solution inlet 86, a resulting biological sample solution outlet 88, and a vent 90. Although the swab chamber 82 can have any suitable shape, in the illustrated embodiment the swab chamber 82 has an elongated cylindrical portion 92 and a half-spherical end portion 94.

Figure 10:
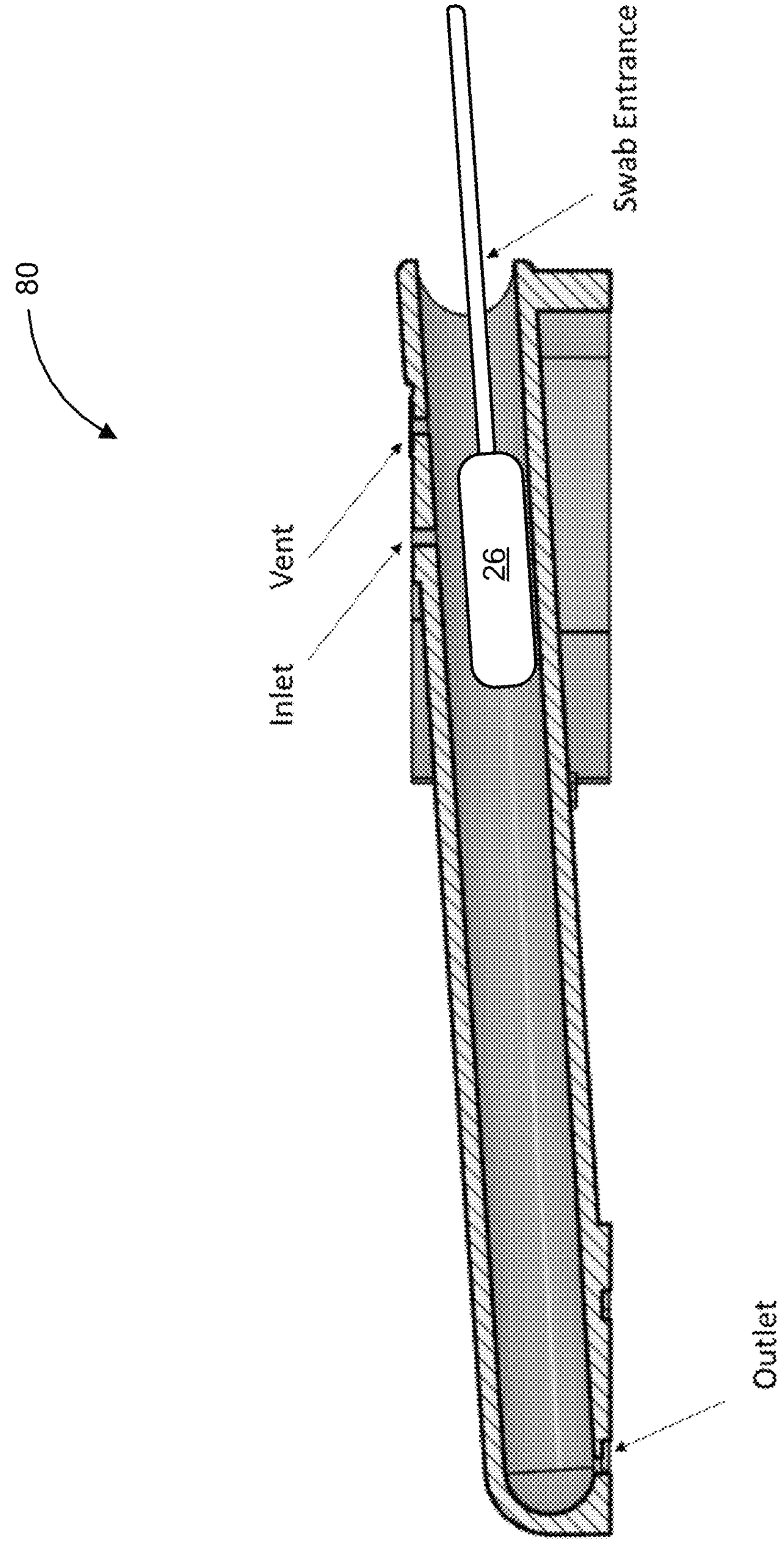
FIG. 10 and FIG. 11 illustrate stages of advancement of the swab head towards the distal end of the swab chamber of the swab chamber housing of FIG. 9.
Figure 11:
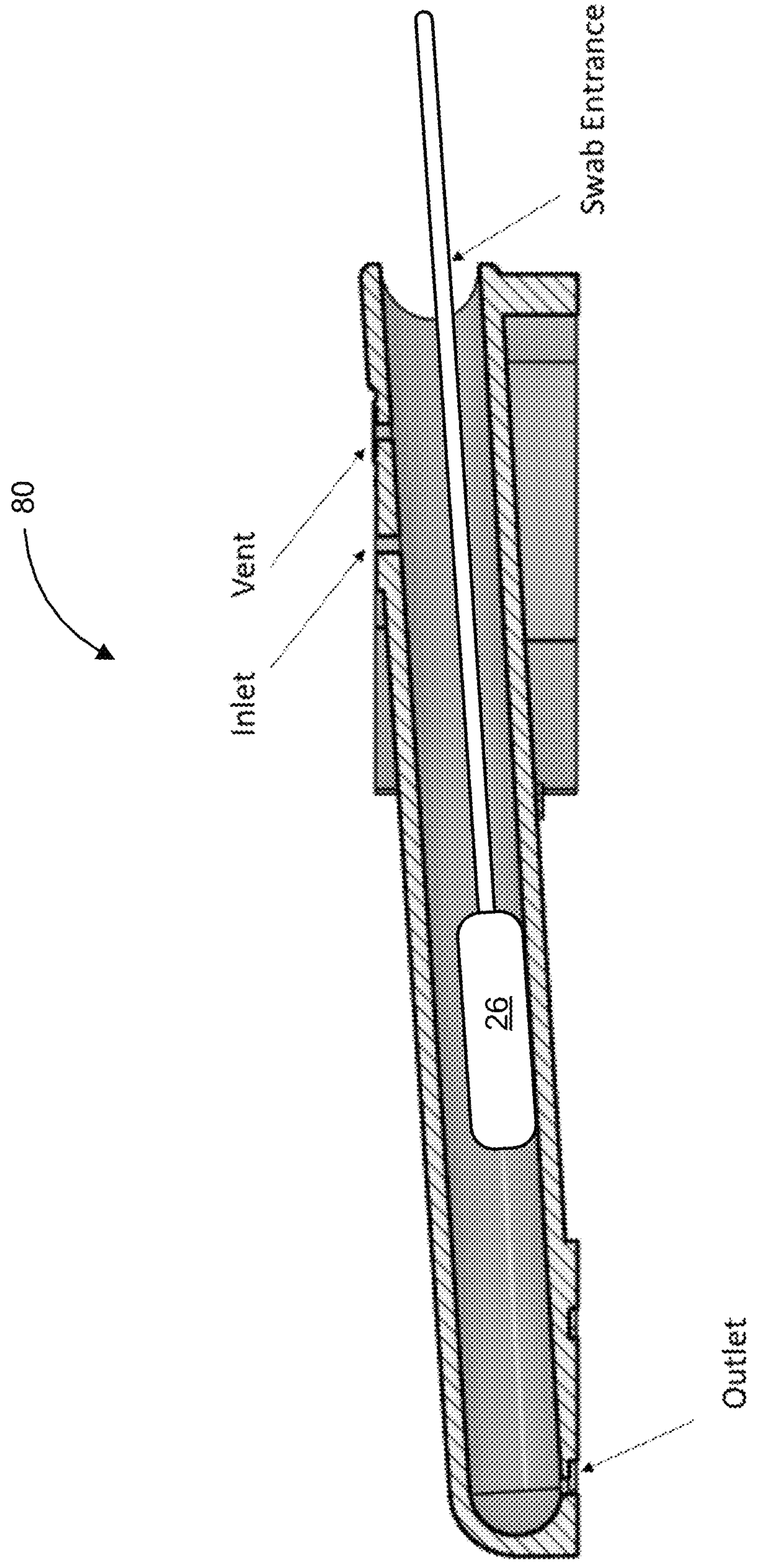
Figure 12:
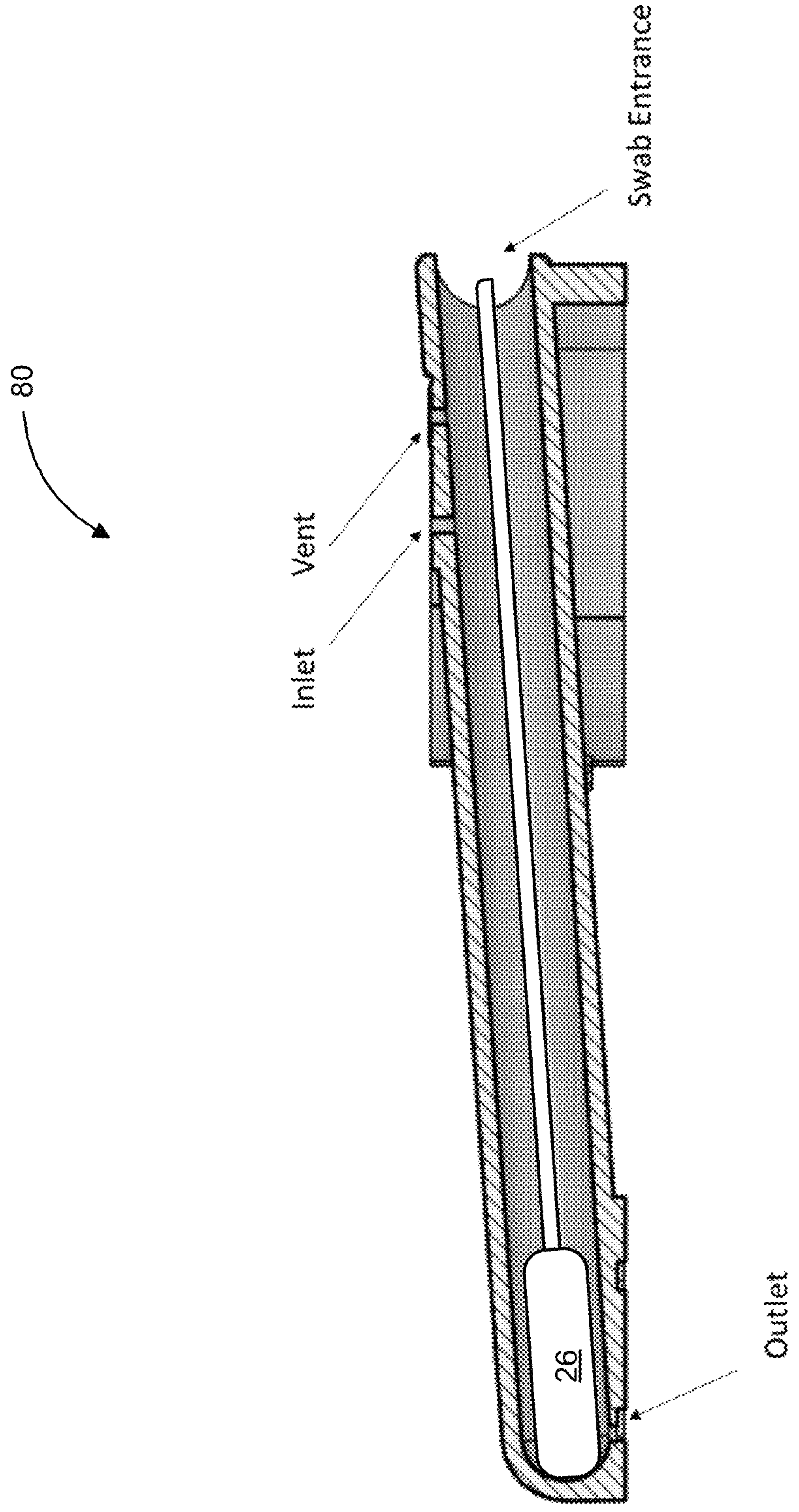
FIG. 12 illustrates the swab head fully inserted into the swab chamber of the swab chamber housing of FIG. 9.

FIG. 10 and FIG. 11 illustrate stages of advancement of a swab head towards the distal end of the swab chamber 82. FIG. 12 illustrates the swab head fully inserted into the swab chamber 82. While the swab chamber 82 can have any suitable cross-sectional diameter, in the illustrated embodiment, the swab chamber 82 has a cross-sectional diameter sufficiently larger than a cross-sectional diameter of the swab head so that contact between the swab head and side and upper portions of the cylindrical wall of the swab chamber 82 can be minimized by sliding the swab head along a bottom portion of the cylindrical wall of the swab chamber 82. By reducing contact of the swab head with the top portion of the cylindrical wall of the swab chamber 82, a portion of the biological sample disposed on the swab head prior to insertion of the swab into the swab chamber 82 that is deposited on the cylindrical wall of the swab chamber 82 during insertion of the swab head can be largely concentrated on the bottom portion of the cylindrical wall of the swab chamber 82. The lysis buffer solution inlet 86 is disposed close to the swab entrance 84 thereby ensuring that the lysis buffer solution transferred into the swab chamber 82 following insertion of the swab into the swab chamber 82 will flow over a substantial length of the bottom portion of the cylindrical wall of the swab chamber 82 and may thereby pick up a substantial portion of the portion of the biological sample disposed on the cylindrical wall of the swab chamber 82 prior to reaching the swab head disposed at the end of the swab head chamber 82. The slope of the swab chamber 82 concentrates the lysis buffer solution at the distal end of the swab chamber 82, thereby reducing the amount of lysis buffer solution required to sufficiently submerge the swab head to combine a sufficient amount of the biological sample on the swab head with the lysis buffer solution to form a resulting biological sample solution for processing for any suitable purpose, such as to detect whether a target pathogen is present in the biological sample. As illustrated in FIG. 12, the biological sample solution outlet 88 is located at a low point of the swab chamber 82 so as to enhance extraction of the resulting biological sample solution from the swab chamber 82. Additionally, as illustrated in FIG. 12, the end portion 94 of the swab chamber 82 can be shaped so that the swab head is held elevated from the biological sample solution outlet 88 to accommodate flow of the resulting biological sample solution around the swab head during extraction of the biological sample solution from the swab chamber 82.

Figure 13:
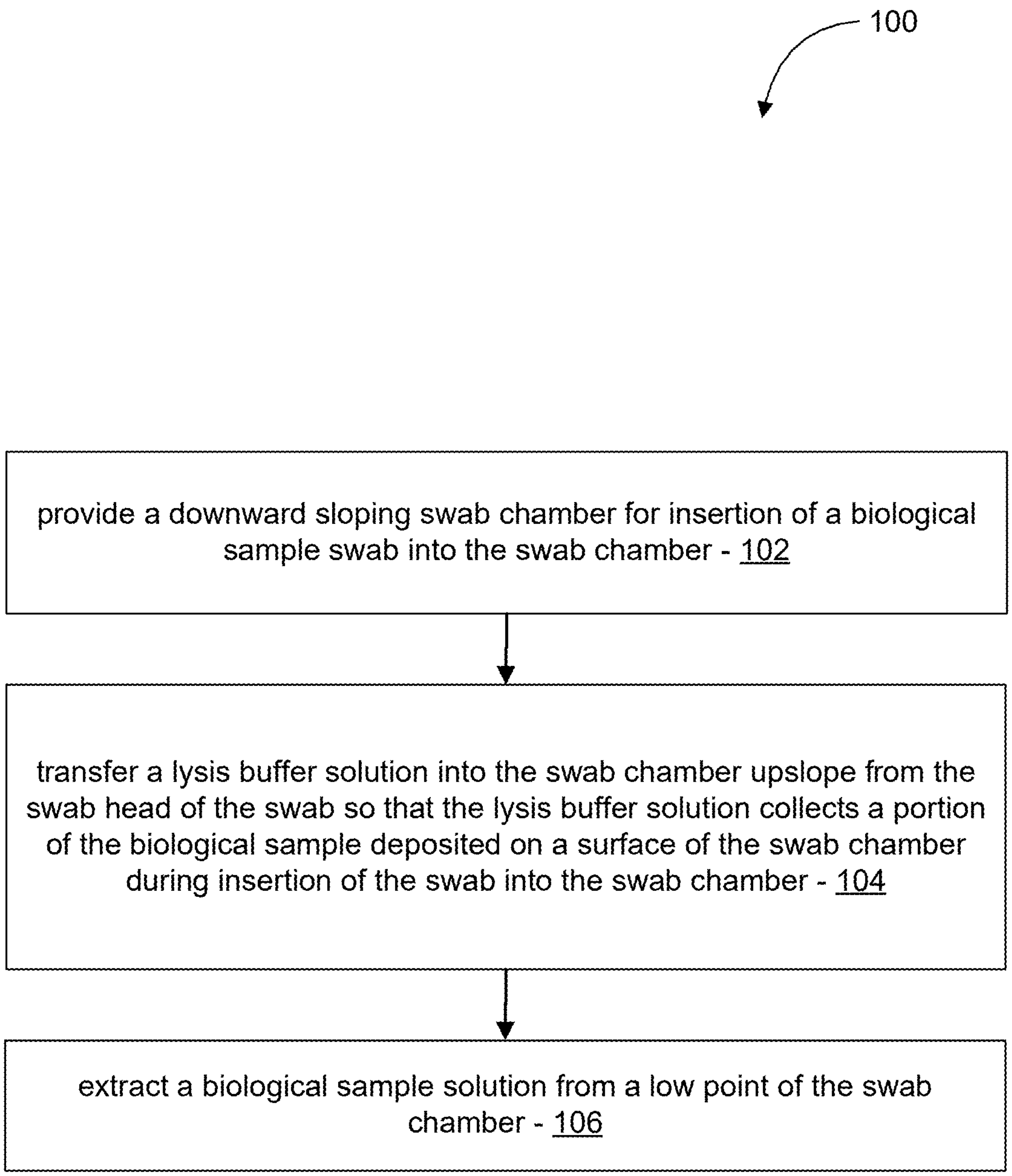
FIG. 13 is a simplified block diagram of acts of a method for forming a biological sample solution from a biological sample that can be practiced using the swab chamber housing of FIG. 9.

FIG. 13 is a simplified block diagram of acts of a method 100 for forming a biological sample solution from a biological sample that can be practiced using the swab chamber housing 80. In act 102, a swab chamber housing is provided that includes a swab entrance and an elongated swab chamber having a use orientation. The elongated swab chamber has a downward slope from the swab entrance to a distal end of the elongated swab chamber in the use orientation. The elongated swab chamber is configured to accommodate insertion of a swab including the biological sample disposed on a swab head of the swab to dispose the swab head within a distal end portion of the elongated swab chamber. In act 104, a lysis buffer solution is transferred into the elongated swab chamber upslope from the swab head disposed within the distal end portion of the elongated swab chamber so that the lysis buffer solution collects a portion of the biological sample deposited on a surface of the elongated swab chamber during insertion of the swab into the elongated swab chamber. In act 106, a resulting biological sample solution is extracted from a low point of the elongated swab chamber.

Figure 14:
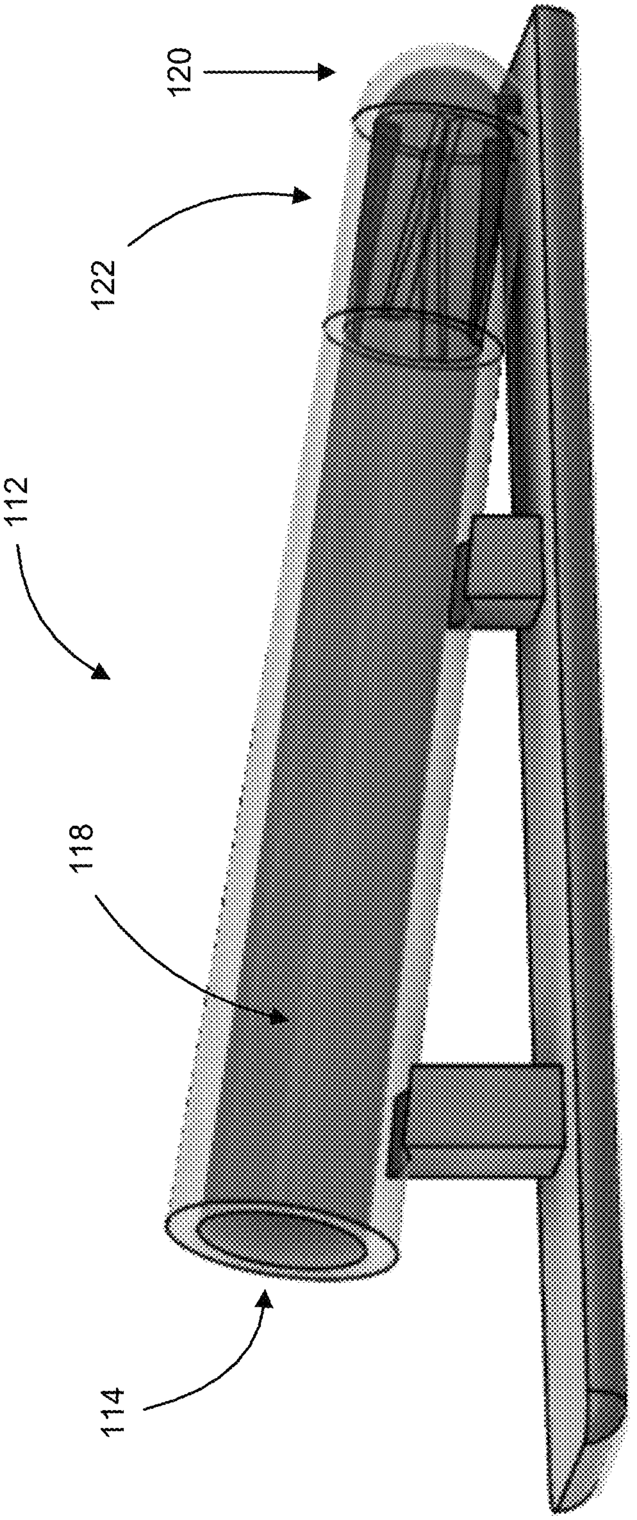
FIG. 14 illustrates a swab chamber housing with a sloped swab chamber that can be used in another alternate embodiment of the biological sample processing system of FIG. 1.
Figure 15:
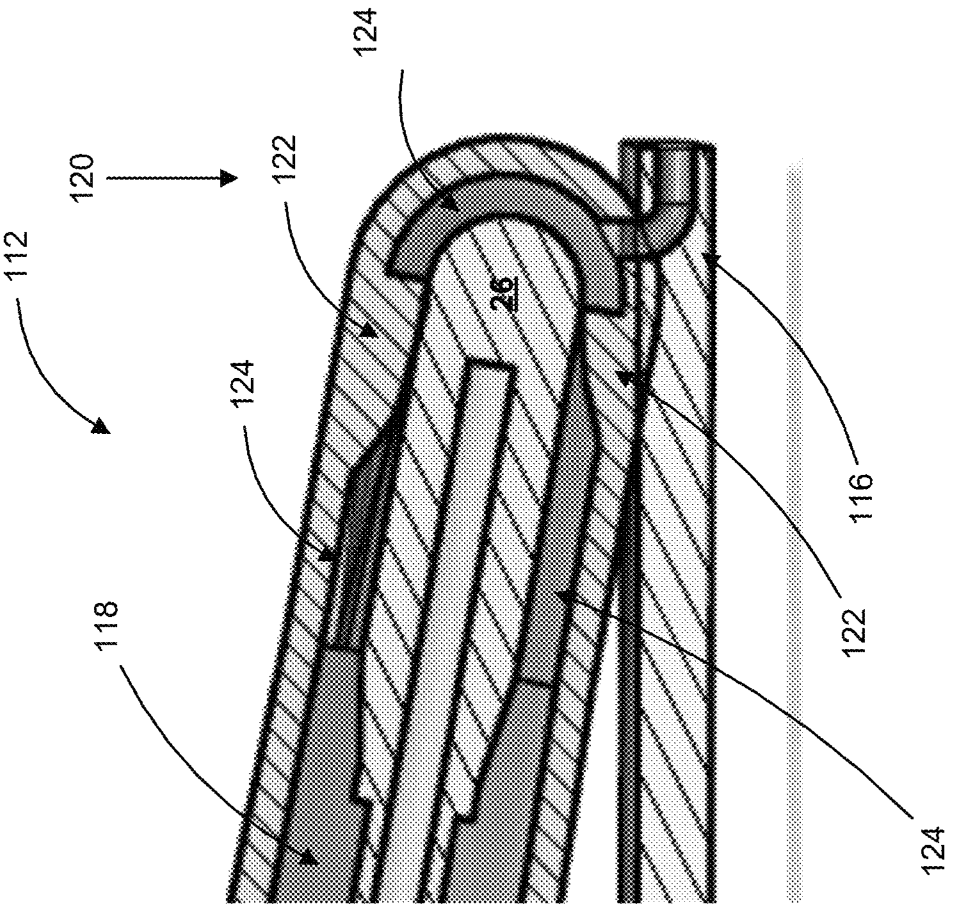
FIG. 15 illustrates a distal end portion of the swab chamber housing of FIG. 14.

FIG. 14 and FIG. 15 illustrate a swab chamber housing 112 that can be used in another alternate embodiment of the biological sample processing system 10. The swab chamber housing 112 includes a swab entrance 114, a fluid channel 116, and an elongated swab chamber 118. The swab chamber 118 has a suitable downward slope (10 degrees in the illustrated embodiment) from the swab entrance 114 to a distal end 120 of the swab chamber 118 in a use orientation of the swab chamber housing 112. The fluid channel 116 is disposed near the distal end 120 of the swab chamber 118 to accommodate input of a lysis buffer solution into a distal portion of the swab chamber 118. A resulting biological sample solution can be removed from the distal portion of the swab chamber 118 via any suitable fluid channel, such as the fluid channel 116 or another fluid channel disposed similar to the fluid channel 116. The swab chamber housing 112 includes elongated ridges 122 that protrude inwardly into the swab chamber 118 in the distal portion of the swab chamber 118. The elongated ridges 122 are configured to engage the swab head 26 so as to form flow channels 124 between the swab head 26 and the swab chamber housing 112 that accommodate flow of the lysis buffer solution and the resulting biological sample solution along exterior portions of the swab head 26. In the illustrated embodiment, each of the elongated ridges 122 extend helically around a length of the swab chamber 118. The swab chamber 118 can have any suitable downward slope. In many embodiments, the downward slope of the swab chamber 118 is in a range of 3 degrees to 20 degrees. In some embodiments, the downward slope of the elongated swab chamber 118 is in a range of 12 degrees to 18 degrees. The swab chamber 118 can have any suitable cross-sectional shape. For example, in many embodiments the swab chamber 118 has a circular cross-section. The circular cross-section can have any suitable diameter. For example, in some embodiments, the diameter of the circular cross-section is in a range from 4 mm to 8 mm. The height of swab chamber housing 112 is 18.6 mm. The swab chamber 112, however, can have any suitable height that is preferably not more than 30 mm.

Figure 16:
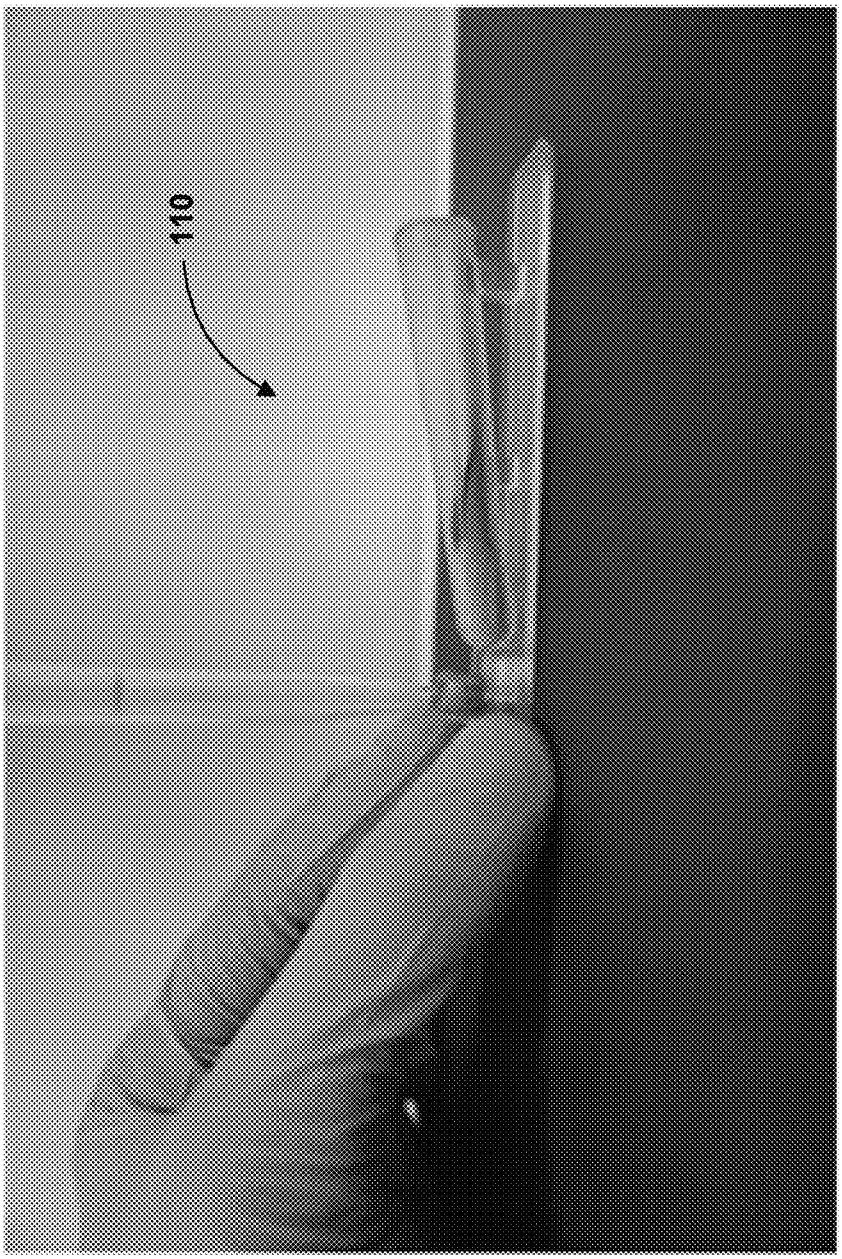
FIG. 16 is an image that illustrates testing of a prototype of the swab chamber housing of FIG. 14.

FIG. 16 is an image that illustrates testing of a prototype 110 of the swab chamber housing 112. In the testing, 465 μL of liquid was injected into the swab chamber 118 via the fluid channel 116 and removed from the swab chamber 118 via the fluid channel 116. The swab head 26 remained still during the injection and removal of the liquid. The top surface of the swab head 26 remained dry during the testing, indicating that 465 uL is an insufficient amount of liquid to fully submerge the swab head 26 in the prototype 110.

Figure 17:
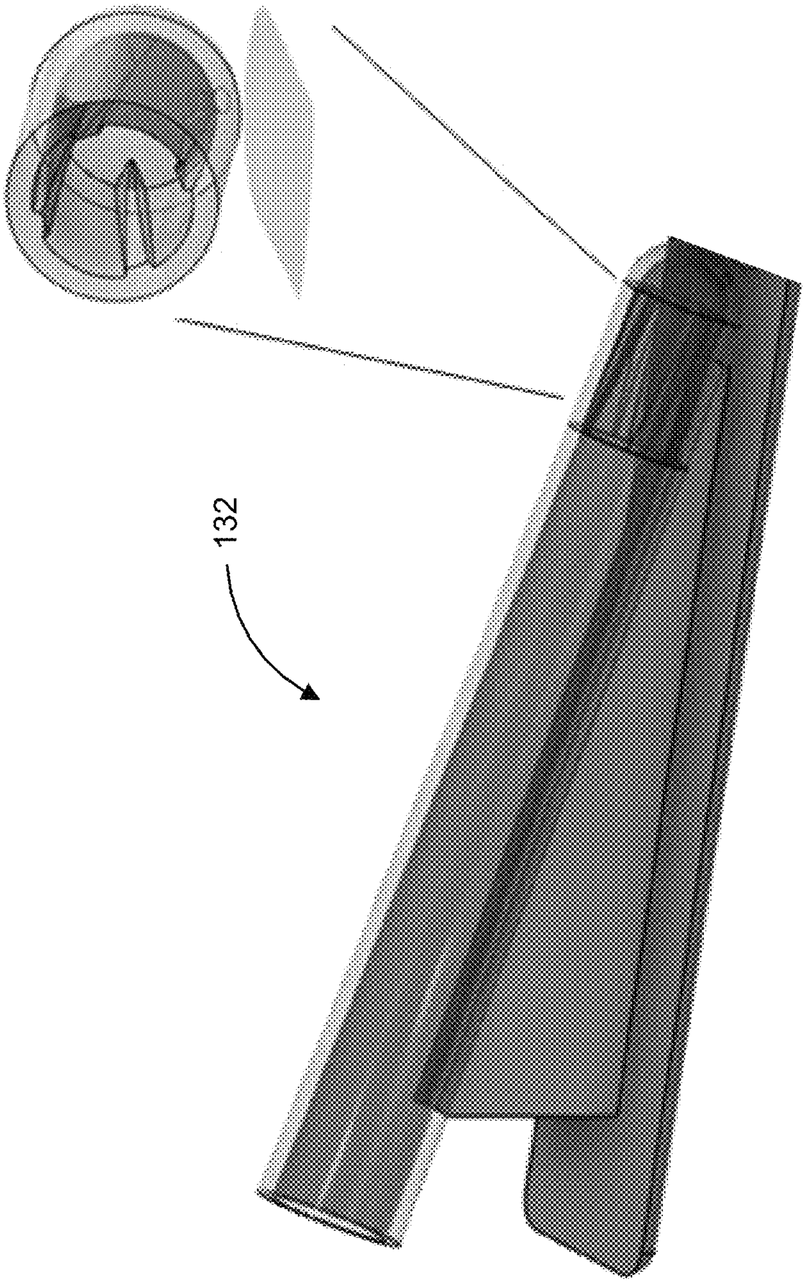
FIG. 17 illustrates another swab chamber housing with a sloped swab chamber that can be used in another alternate embodiment of the biological sample processing system of FIG. 1.

FIG. 17 illustrates a swab chamber housing 132 with a swab chamber having another downward slope (15 degrees in the illustrated embodiment) that can be used in another alternate embodiment of the biological sample processing system 10. Except for the change in slope, the swab chamber housing 132 is configured the same as the swab chamber housing 112.

Figure 18:
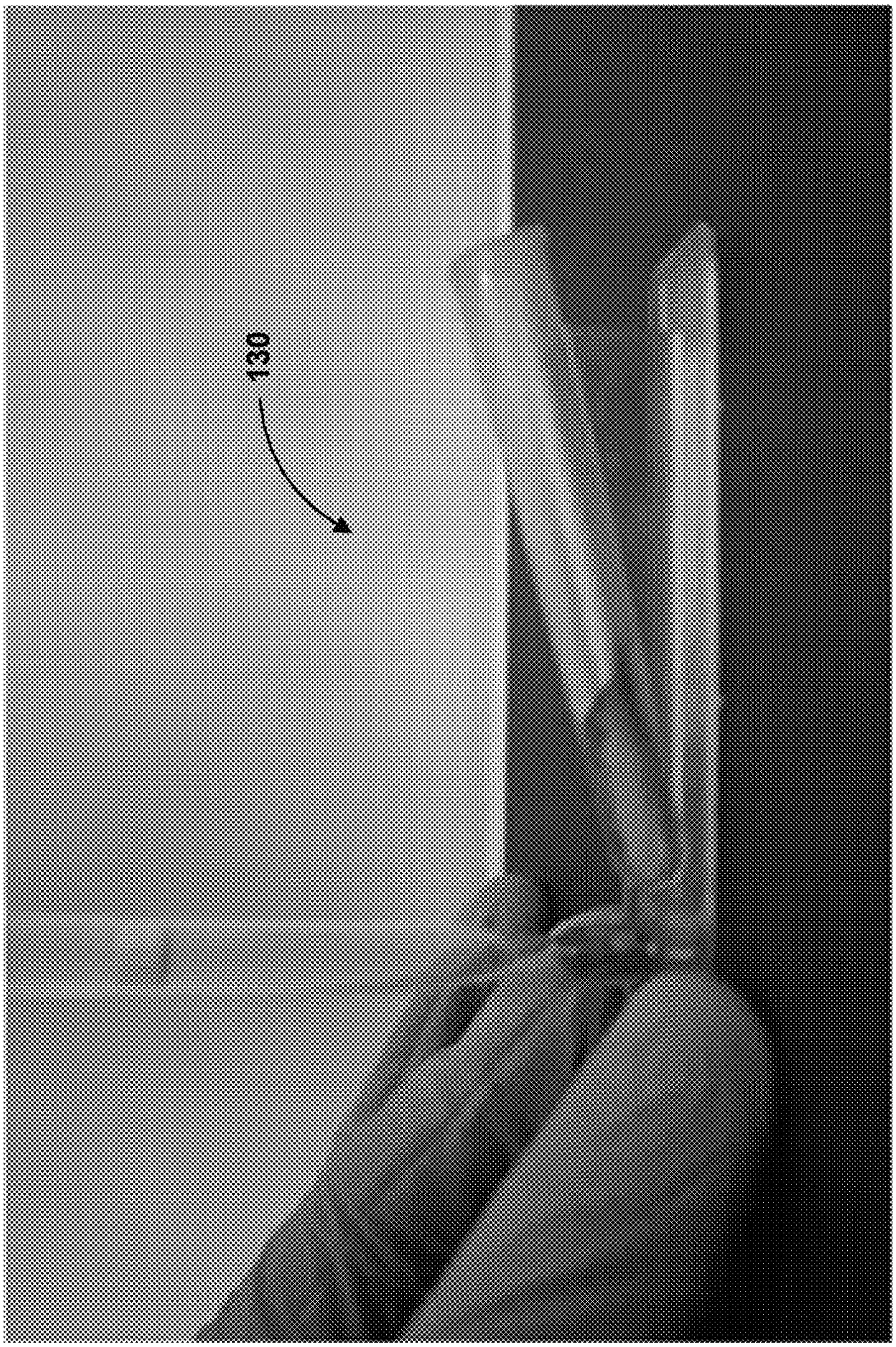
FIG. 18 is an image that illustrates testing of a prototype of the swab chamber housing of FIG. 17.

FIG. 18 is an image that illustrates testing of a prototype 130 of the swab chamber housing 132. In the testing, 390 μL of liquid was injected into the swab chamber and removed from the swab chamber. The swab head 26 remained still during the injection and removal of the liquid. The swab head 26 became fully submerged during the testing, indicating that 390 uL is a sufficient amount of liquid to submerge the swab head 26 in the prototype 130.

Figure 19:
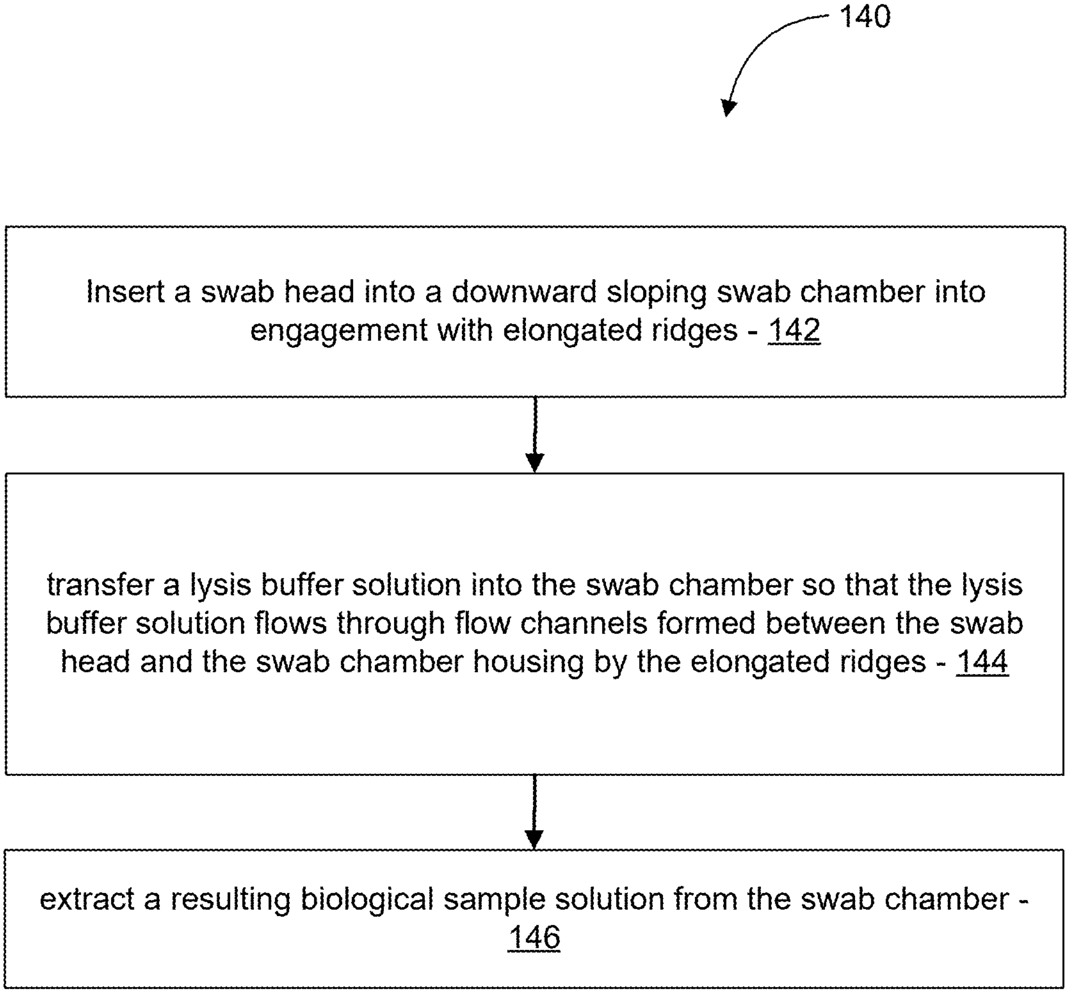
FIG. 19 is a simplified block diagram of acts of a method for forming a biological sample solution from a biological sample that can be practiced using the swab chamber housing of FIG. 14 or the swab chamber housing of FIG. 17.

FIG. 19 is a simplified block diagram of acts of a method 140 for forming a biological sample solution from a biological sample that can be practiced using the swab chamber housing 112 or the swab chamber housing 132. In act 142, a swab chamber housing is provided that includes a swab entrance, a fluid channel, and an elongated swab chamber having a use orientation. The swab chamber has a downward slope from the swab entrance to a distal end of the elongated swab chamber in a use orientation of the swab chamber housing. The swab chamber is configured to accommodate insertion of a swab including a biological sample disposed on a swab head of the swab to dispose the swab head within a distal end portion of the swab chamber. The swab chamber housing includes elongated ridges that protrude inwardly into the swab chamber in the distal portion of the elongated swab chamber. The elongated ridges are configured to engage the swab head so as to form flow channels between the swab head and the swab chamber housing that accommodate flow of lysis buffer solution and a resulting biological sample solution along exterior portions of the swab head. In act 144, a lysis buffer solution is transferred into the distal end portion of the elongated swab channel through the fluid channel so that the lysis buffer solution flows through the flow channels between the swab head and the swab chamber housing. In act 146, a resulting biological sample solution is extracted from the distal end portion of the elongated swab channel.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims. For example, any compatible features of the swab chamber housings 80, 112 can be employed in the swab chamber 30. Any of the compatible features of the swab chamber assembly 28 and the swab chambers 30, 112 can be employed with or by the swab chamber 80. And any of the compatible features of the swab chamber assembly 28 and the swab chambers 30, 80 can be employed with or by the swab chamber 112.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A cartridge for use with a biological sample processing device to process a biological sample into a biological sample solution, the cartridge comprising:

an outer shell;

a swab chamber assembly disposed within the outer shell and comprising a swab chamber housing and a swab head sleeve, wherein the swab chamber housing comprises a fluid channel, a lysis buffer solution inlet, and an elongated swab chamber having a proximal portion and a distal portion, wherein the swab chamber assembly is reconfigurable from an initial configuration to a swab inserted configuration, wherein the swab head sleeve is retained within the proximal portion of the elongated swab chamber and separated from a swab in the initial configuration, wherein the swab head sleeve defines a swab head receptacle configured to receive a swab head of the swab, wherein the swab head sleeve is disposed within the distal portion of the elongated swab chamber via insertion of the swab head into the swab head receptacle and pushing of the swab head sleeve via the swab head in the swab inserted configuration, and wherein the swab head sleeve is configured to inhibit contact between the swab head and the swab chamber housing during insertion of the swab into the cartridge and accommodate flow of a lysis buffer solution to transfer a biological sample from the swab head to the lysis buffer solution to form a biological sample solution; and a lysis buffer assembly comprising the lysis buffer solution and operable to supply the lysis buffer solution;

wherein the biological sample processing device is configured to hold the cartridge to orient a reference gravity direction of the cartridge vertically downward;

wherein the elongated swab chamber is shaped so that, when the cartridge is disposed within the biological sample processing device, the distal portion of the elongated swab chamber slopes downwardly from a distal end of the proximal portion of the elongated swab chamber so that the lysis buffer solution accumulates within the distal portion;

wherein the lysis buffer solution inlet is disposed upslope and proximally from the swab head sleeve in the swab inserted configuration; and wherein the cartridge is operable to operate the lysis buffer assembly to supply the lysis buffer solution through the lysis buffer solution inlet to the elongated swab chamber and transfer the biological sample solution from the elongated swab chamber via the fluid channel for processing of the biological sample solution within the cartridge.

2. The cartridge of claim 1, wherein:

the swab head sleeve comprises annular rings and longitudinal struts that at least partially define the swab head receptacle;

the annular rings are spaced apart by the longitudinal struts in a longitudinal direction of the swab head sleeve; and the swab head sleeve comprises annular apertures, wherein each of the annular apertures is defined by a corresponding pair of the annular rings in combination with a corresponding pair of the longitudinal struts.

3. The cartridge of claim 2, wherein:

the swab head receptacle has a tapered profile so as to reduce in diameter in a distal direction of the swab head receptacle; and the swab head sleeve comprises distal tip apertures in a distal end portion of the swab head sleeve through which the swab head receptacle is in fluid communication with the elongated swab chamber.

4. A swab chamber assembly for use in a biological sample processing system to process a biological sample into a biological sample solution, the swab chamber assembly comprising:

a fluid channel;

an elongated swab chamber having a proximal portion and a distal portion, and comprising a lysis buffer solution inlet, wherein the elongated swab chamber is configured to accommodate insertion of a swab head of a swab into the elongated swab chamber to dispose the swab head in the distal portion of the elongated swab chamber so that the swab head is disposed distal to the lysis buffer solution inlet, wherein the elongated swab chamber is shaped and oriented via the biological sample processing system so that the distal portion of the elongated swab chamber slopes downwardly from a distal end of the proximal portion of the elongated swab chamber so that a lysis buffer solution transferred into the elongated swab chamber accumulates within the distal portion of the elongated swab chamber; and a lysis buffer assembly comprising the lysis buffer solution and operable to transfer the lysis buffer solution into the elongated swab chamber through the lysis buffer solution inlet.

5. The swab chamber assembly of claim 4, comprising a swab head sleeve, wherein the swab chamber assembly is reconfigurable from an initial configuration to a swab inserted configuration, wherein the swab head sleeve is retained with in the proximal portion of the elongated swab chamber in the initial configuration, wherein the swab head sleeve is disposed within the distal portion of the elongated swab chamber via insertion of the swab head into the swab head sleeve and pushing of the swab head sleeve via the swab in the swab inserted configuration, and wherein the swab head sleeve is configured to inhibit contact between the swab head and a wall of the elongated swab chamber during insertion of the swab into the elongated swab chamber and accommodate flow of a lysis buffer solution to transfer a biological sample from the swab head to the lysis buffer solution to form a biological sample solution.

6. The swab chamber assembly of claim 5, wherein:

the swab head sleeve comprises annular rings and longitudinal struts;

the annular rings are spaced apart by the longitudinal struts in a longitudinal direction of the swab head sleeve; and the swab head sleeve comprises annular apertures, wherein each of the annular apertures is defined by a corresponding pair of the annular rings in combination with a corresponding pair of the longitudinal struts.

7. The swab chamber assembly of claim 6, wherein the swab head sleeve has a tapered profile so as to reduce in diameter in a distal direction of the swab head sleeve.

8. The swab chamber assembly of claim 7, wherein the swab head sleeve comprises distal tip apertures in a distal end portion of the swab head sleeve.

9. The swab chamber assembly of claim 7, wherein the swab head sleeve comprises three annular rings.

10. The swab chamber assembly of claim 5, wherein the elongated swab chamber comprises detent features configured to:

interface with the swab head sleeve in the initial configuration of the swab chamber assembly to retain the swab head sleeve; and disengage from the swab head sleeve in response to distal advancement of the swab head to accommodate reconfiguration of the swab chamber assembly from the initial configuration to the swab inserted configuration.

11. The swab chamber assembly of claim 4, comprising a vent configured for venting the elongated swab chamber.

12. The swab chamber assembly of claim 11, comprises elongated ridges that protrude inwardly into the elongated swab chamber in the distal portion of the elongated swab chamber, wherein the elongated ridges are configured to engage a swab head of a swab so as to form flow channels between the swab head and a wall of the elongated swab chamber that accommodate flow of the lysis buffer solution and the biological sample solution along exterior portions of the swab head.

13. The swab chamber assembly of claim 4, having a height equal to or less than 20 mm.

14. A method of forming a biological sample solution from a biological sample, the method comprising:

retaining a swab head sleeve within a proximal portion of an elongated swab chamber defined by a swab chamber surface of a swab chamber housing, wherein the swab head sleeve is retained within the proximal portion of the elongated swab chamber and separated from a sample swab in an initial configuration, wherein the swab head sleeve defines a swab head receptacle configured to receive a swab head of the sample swab, wherein the sample swab comprises a sample swab shaft attached to the swab head, and wherein a distal portion of the elongated swab chamber slopes downwardly from a distal end of the proximal portion of the elongated swab chamber;

receiving the swab head into the swab head receptacle;

guiding, via the swab head sleeve, the swab head along the elongated swab chamber so as to keep the swab head spaced from the swab chamber surface to inhibit transfer of a biological sample disposed on the swab head to the swab chamber surface; and with the swab head disposed in the swab head receptacle disposed at a distal end of the elongated swab chamber, transferring a lysis buffer solution into the elongated swab chamber through a lysis buffer solution inlet disposed upslope and proximal to the swab head sleeve to expose the swab head to the lysis buffer solution to transfer the biological sample from the swab head to the lysis buffer solution to form the biological sample solution.

15. The method of claim 14, wherein the lysis buffer solution accumulates within the distal portion of the elongated swab chamber subsequent to being transferred into the elongated swab chamber.

16. The method of claim 14, wherein:

the swab head sleeve comprises annular rings and longitudinal struts;

the annular rings are spaced apart by the longitudinal struts in a longitudinal direction of the swab head sleeve;

the swab head sleeve comprises annular apertures, wherein each of the annular apertures is defined by a corresponding pair of the annular rings in combination with a corresponding pair of the longitudinal struts;

the swab head sleeve has a tapered profile so as to reduce in diameter in a distal direction of the swab head sleeve; and the swab head sleeve comprises distal tip apertures in a distal end portion of the swab head sleeve.

17. The method of claim 14, comprising transferring the biological sample solution from the elongated swab chamber for processing of the biological sample solution.

18. The method of claim 14, wherein the swab chamber housing comprises detent features configured to:

interface with the swab head sleeve to retain the swab head sleeve within the proximal portion of the elongated swab chamber; and disengage from the swab head sleeve in response to distal advancement of the swab head to accommodate translation of the swab head sleeve along the elongated swab chamber.

* * * * *